April 21, 1953     P. J. HERBST     2,636,166
BEARING DEVIATION INDICATION SYSTEM
Filed Sept. 10, 1947     5 Sheets-Sheet 3
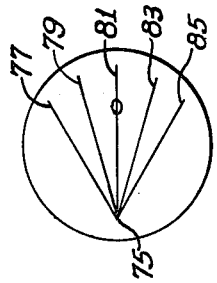
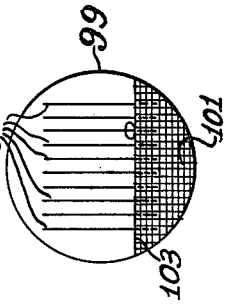
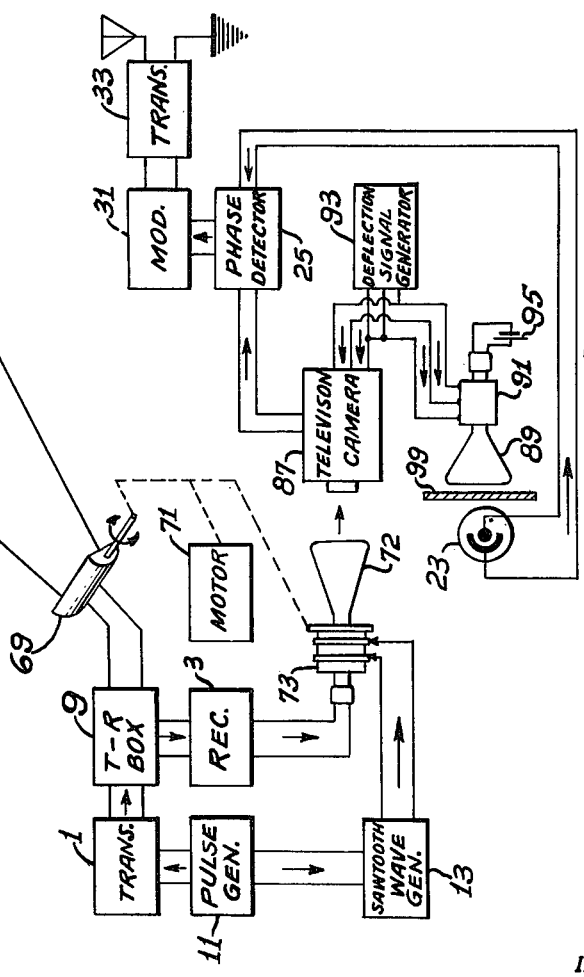
INVENTOR.
*Philip J. Herbst*
BY

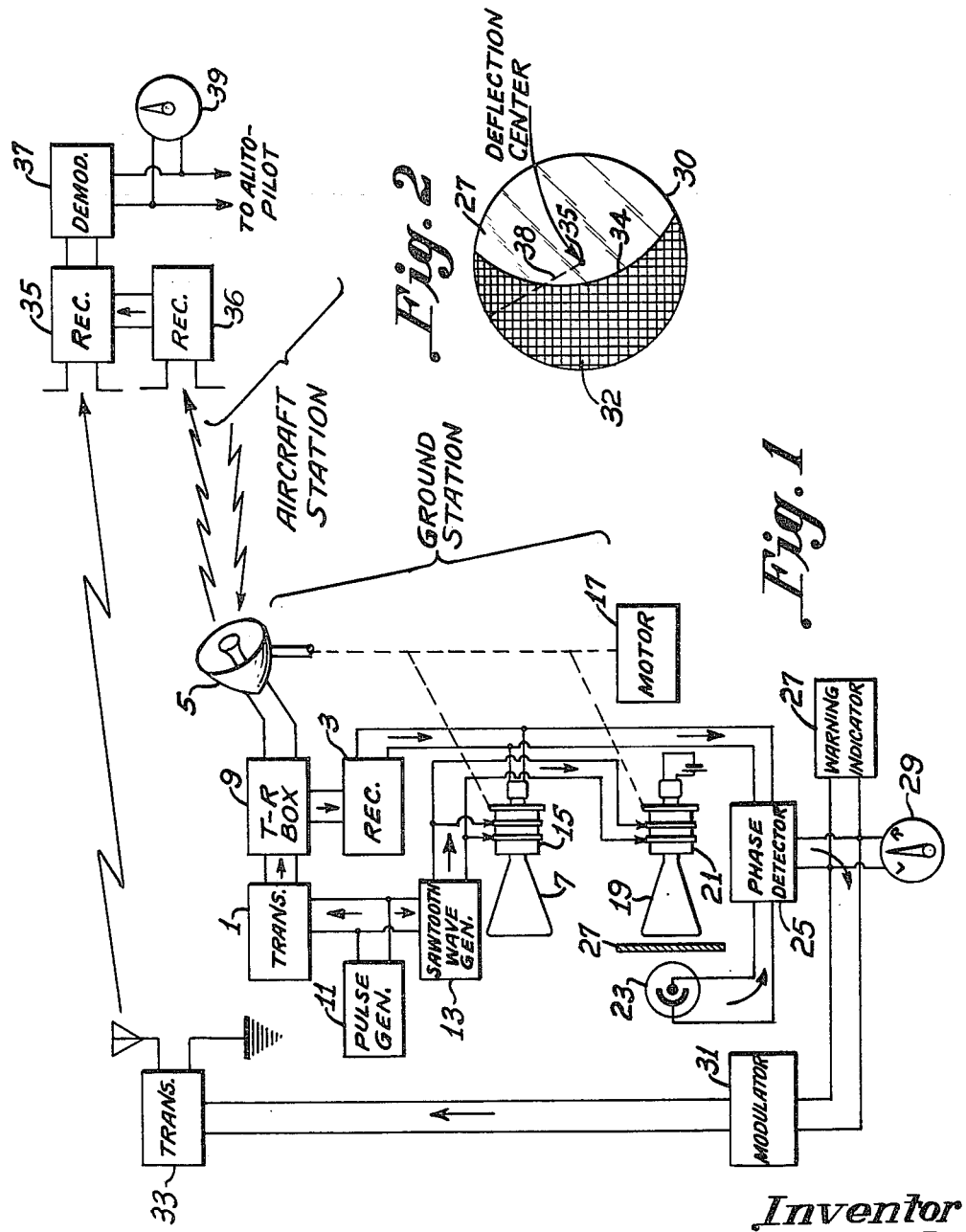

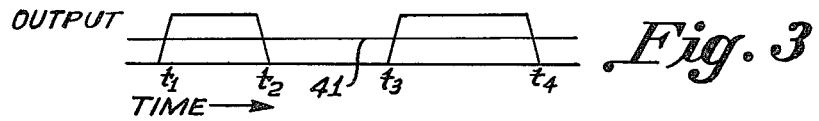
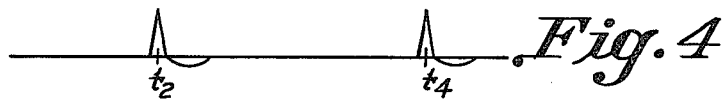
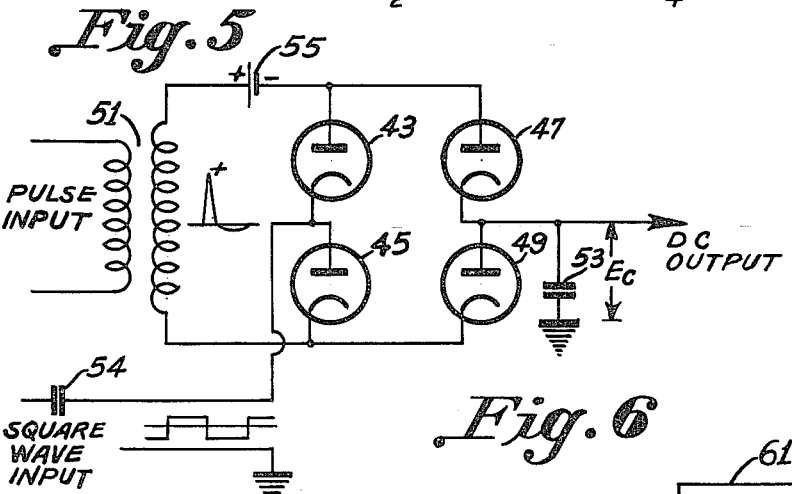
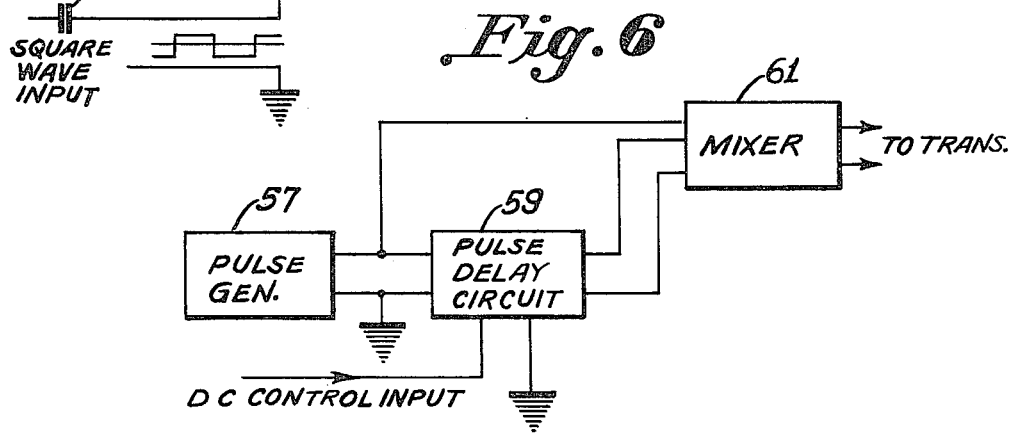
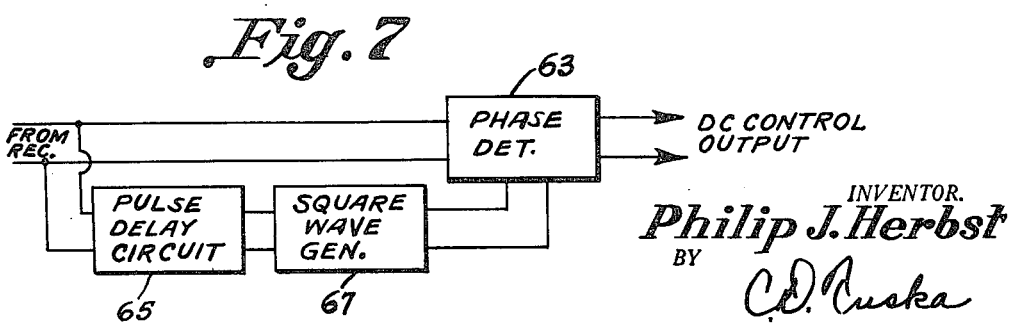

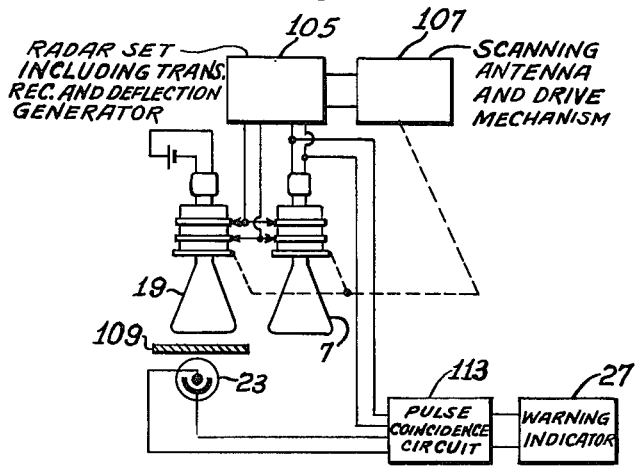
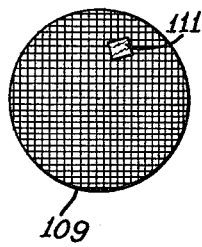
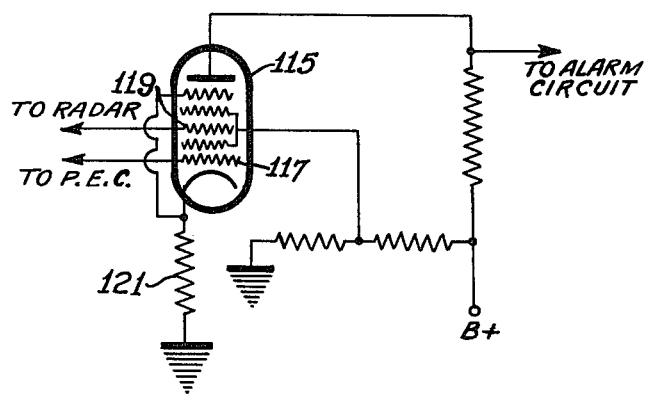
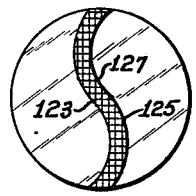

April 21, 1953  P. J. HERBST  2,636,166
BEARING DEVIATION INDICATION SYSTEM
Filed Sept. 10, 1947  5 Sheets-Sheet 5
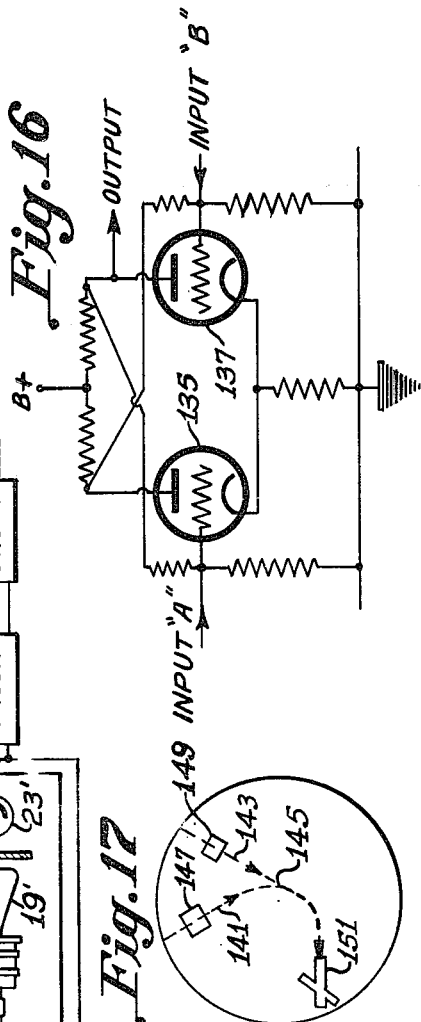
Inventor:
Philip J. Herbst
By C.D. Tuska
ATTORNEY Patented Apr. 21, 1953

2,636,166

UNITED STATES PATENT OFFICE 2,636,166

BEARING DEVIATION INDICATION SYSTEM

Philip J. Herbst, Princeton, N. J., assignor to Radio Corporation of America, a corporation of Delaware Application September 10, 1947, Serial No. 773,142

5 Claims. (Cl. 343—6)

This invention relates to radio navigation systems for aircraft, and more particularly to systems for determining the position of a mobile craft with respect to a predetermined line or point.

One of the objects of the invention is to provide warning signals and automatic control signals by comparison between echo signals derived from a search radar set and locally generated signals which represent a prescribed course.

Another object is to provide a method of and means for generating signals representing a predetermined course, in a form suitable for comparison with radar echo signals to effect the foregoing object.

A further object of this invention is to provide a system which gives an alarm or warning indication in response to the entry of an aircraft within a predetermined area or block.

The invention will be described with reference to the accompanying drawings, wherein:

Fig. 1 is a schematic diagram of a course deviation indicator and control system embodying the present invention, Fig. 2 shows a mask used in the system of Fig. 1 to define the course to be followed by an aircraft, Fig. 3 is an oscillogram showing the wave form of the course-defining signal generated in the system of Fig. 1, Fig. 4 is an oscillogram showing pulse echo signals produced in the system of Fig. 1 by reflection from an aircraft, Fig. 5 is a circuit diagram of the phase detector used in the system of Fig. 1, Fig. 6 is a block diagram showing the elements of a suitable modulator apparatus for the system of Fig. 1, Fig. 7 is a block diagram showing the elements of a demodulator which may be used in the airborne equipment of the system of Fig. 1, Fig. 8 is a schematic diagram of a modification of the system of Fig. 1, particularly adapted to glide-path indication or automatic landing of an aircraft, Fig. 9 shows an expanded-sweep sector scanning pattern of the type which appears on the cathode ray indicator tube in the system of Fig. 8, Fig. 10 shows a mask used in the system of Fig. 8 to define the glide path to be followed by an aircraft, and the relationship thereof to the scanning pattern of the television camera in Fig. 8, Fig. 11 is a schematic diagram of a system for providing warning of entry of an aircraft within a predetermined area or block, Fig. 12 shows a mask used in the system of Fig. 11 to define the block or area to be protected or supervised.

Fig. 13 is a schematic diagram of a pulse coincidence circuit suitable for the system of Fig. 11, Fig. 14 shows a mask which may be used with the system of Fig. 11 to give a warning indication in response to deviation of an aircraft from a course defined by the mask, Fig. 15 is a schematic diagram of a modification of the system of Fig. 11 for giving warning of impending conflict between two aircraft following assigned courses which merge or intersect, Fig. 16 is a circuit diagram of a trigger circuit used in the system of Fig. 15, and Fig. 17 illustrates the relationships between typical approach patterns and protected areas in the system of Fig. 15.

Refer to Fig. 1. The system illustrated includes, at a ground station, a search radar set comprising a transmitter 1, a receiver 3, a directive antenna 5, and a cathode ray oscilloscope 7. A T-R box 9 is provided to allow duplexing, i. e., operation of the transmitter and receiver with a comon antenna. A pulse generator 11 modulates the transmitter 1 and also controls a sawtooth wave generator 13. The generator 13 energizes a rotatable deflection yoke 15 on the cathode ray tube 7. The yoke 15 and the antenna 5 are rotated in synchronism by a motor 17. The receiver 3 is connected to the cathode ray beam intensity control electrode of the tube 7.

In the operation of the radar apparatus the transmitter 1 is modulated by the pulse generator 11 to produce a continuous train of pulses of radio frequency energy, at a repetition rate of for example 1000 pulses per second. The pulses are radiated in a narrow beam by the antenna 5. The antenna 5 is rotated in azimuth by the motor 17 at a rate of, for example, ten revolutions per minute, so that the beam scans the area surrounding the station.

When the transmitted beam strikes an object such as an aircraft some of the energy is reflected back to the antenna, received by the receiver 3, and applied to the tube 7 to momentarily intensify the cathode ray and produce a luminous spot on the screen of the tube 7. The sawtooth wave generator energizes the deflection yoke 15 to initiate a linear deflection of the cathode ray beam radially of the screen of the tube 7 coincidentally with the transmission of each pulse. The direction of the radial motion corresponds to the angular position of the antenna 5.

The radial distance of the luminous spot from the center of the screen depends upon the time required for radiation to travel from the transmitter to the reflecting object and back to the receiver, and thus is proportional to the distance of the object. The tube 7 provides a map-like display comprising a luminous spot corresponding in position to each reflecting object within range of the equipment.

This type of display is commonly known as P. P. I., or plan position indication.

In addition to the above described radar equipment, the ground station includes a further cathode ray tube 19, similar to the tube 7 except for the screen persistence characteristic, which should be relatively short. The tube 19 is provided with a yoke 21 like the yoke 15 and driven by the motor 17 in synchronism with the yoke 15.

The beam intensity control electrode of the tube 19 is biased by a source 23 to a potential such that a luminous spot appears continuously on the screen of the tube 19. The scanning yoke 21 is connected to the sawtooth wave generator 13 to cause this spot to move in successive radial lines in synchronism with the motion of the cathode ray beam of the P. P. I. tube 7.

A photoelectric cell 23 is positioned near the screen of the tube 19, and its output is applied to a phase detector 25. The output of the receiver 3 is also applied to the phase detector 25. A mask 27 is disposed between the photoelectric cell 23 and the screen of the tube 19. The mask 27 is shown in elevation in Fig. 2; it comprises a disc or plate 30 of transparent material, partially covered with an opaque coating 32. The edge 34 of the coating 32 is shaped like a map of the course to be followed by an aircraft. The map position of the ground station corresponds to the deflection center 35 of the luminous cathode-ray spot. One radial line of deflection of the spot is represented in Fig. 2 by the dash line 38.

The phase detector 25, as will be described more fully with reference to Fig. 5, provides an output whose polarity depends on the phase relationship between the pulses from the receiver 3 and the output of the photoelectric cell 23. The phase detector 25 is connected to a warning indicator 27, which may comprise a lamp, a bell, or other alarm device responsive to electrical output from the phase detector. A center-zero direct current meter 29, calibrated L–R like the conventional radio compass course deviation indicator, is also connected to the phase detector to show the direction and approximate extent of departure of an aircraft from the desired course.

The output of the phase detector 25 may also be applied to a modulator 31. The modulator 31 includes means for converting the phase detector output to a form suitable for modulation of a transmitter 33. A receiver 35, carried by the aircraft, is tuned to respond to the ground station transmitter 33 and is connected to a demodulator circuit 37 which reconverts the modulation signals to the form in which they appear at the output of the phase detector 25. The demodulator 37 is connected to a deviation indicator 39 like the meter 29 at the ground station. The demodulator output may be applied also to an automatic pilot mechanism (not shown) to effect steering of the aircraft in response to the signals from the ground station. The receiver 35 is normally disabled, as by a suitable bias applied to one of its amplifier stages. A second receiver 36, designed to respond to radar signals transmitted from the antenna 5, overcomes this bias and allows the receiver 35 on any particular craft to operate only when the beam of the antenna 5 bears upon that craft.

The operation of the above described system is as follows: The luminous spot on the screen of the tube 19 is at every instant at a position corresponding to the position where a spot would appear on the screen of the tube 7 if a reflected pulse were being received at that instant. When the spot is behind the transparent portion 30 of the mask 27, the photoelectric cell 23 is illuminated and provides output. When the spot is behind the opaque portion 32, no light reaches the photoelectric cell and there is no output.

Thus as the spot travels along a radial line, such as the line 38 of Fig. 2, the cell 23 provides output until the spot reaches the edge 34, and then gives zero output until it starts to scan the next radial line. Fig. 3 shows a typical output wave from the photoelectric cell. At the time $t_1$ the spot starts from the deflection center 36. At $t_2$, it reaches the line 34. From $t_2$ to $t_3$, it is travelling radially outward behind the opaque portion 32 of the mask. At $t_3$, it starts to move outward again along the next radial scanning line, reaching the edge 34 at the time $t_4$. The A.-C. axis of the wave of Fig. 3 is the line 41.

Now suppose there is an aircraft at some position on the line in space which corresponds to the edge 34 on the mask 27. During the brief interval in which the beam of the antenna 5 intercepts the craft, a number of pulses will be reflected and received at the ground station. These pulses will arrive at instants like $t_2$ and $t_4$ of Fig. 3, when the spot of the cathode ray tube 19 is crossing the margin 34 between the transparent and opaque portions of the mask 27. Two such pulses are represented at $t_2$ and $t_4$ in Fig. 4.

The phase detector 25 produces no output when the phase relationship between the two inputs is as shown in Figs. 3 and 4. If the pulse occurs during the interval when the output of the photoelectric cell is above the A.-C. axis, the phase detector provides an output of one polarity, say positive. If the pulse occurs during the interval when the wave of Fig. 3 is below the A.-C. axis, the phase detector output is of the opposite (negative) polarity.

Referring to Fig. 5, a suitable circuit for the phase detector 25 includes four diodes 43, 45, 47 and 49. The diodes 43 and 45 are connected in series across the secondary of a transformer 51, and the diodes 47 and 49, also in series with each other, form a parallel path. The pulses from the receiver 3 are applied to the transformer 51 in such polarity that the sharp peaks are positive in the direction of the anodes of the diodes 43 and 47.

The approximately square wave output voltage of the photoelectric cell 23 is applied to the junction between the diodes 43 and 45, and through a capacitor 53 to the corresponding junction of the diodes 47 and 49. The lower terminal of the capacitor 53 and the photoelectric cell input circuit may be grounded. A capacitor 54 is provided in the lead to the diodes 43 and 45 to eliminate the D.-C. component of the photocell voltage. A bias source 55 is included in the connection between the transformer 51 and the diode network polarized so as to oppose conduction through the diodes.

The bias voltage and the amplitudes of the pulse and square wave inputs are adjusted so that neither the square wave voltage nor the pulse voltage alone is sufficient to overcome the bias and cause conduction. Thus, when the pulse occurs coincidentally with the zero crossover of the square wave, as shown in Figs. 3 and 4, no current flows through any of the diodes.

If the pulse occurs during a positive excursion of the square wave, current flows through the diodes 45 and 47, charging the capacitor 53 positive, the diodes 43 and 49 remaining cut off. If the pulse occurs during a negative excursion of the square wave, the diodes 43 and 49 conduct, charging the capacitor so that its upper terminal is negative with respect to ground.

Owing to the finite diameter of the spot on the cathode ray tube 19, the "square" wave produced by the photocell is somewhat trapezoidal as shown in Fig. 3. As long as the pulse occurs somewhere within the sloping edge portion of the trapezoid, the voltage $E_c$ across the capacitor will be substantially proportional to the deviation of the pulse from the zero crossover of the trapezoid. Further deviation will cause no increase in $E_c$.

The capacitor 53 tends to retain the voltage $E_c$ until there is a change in the phase relationship between the two inputs. Thus, when the beam of the antenna 5 (Fig. 1) has swept past the aircraft and the return pulses have ceased, the voltage $E_c$ will remain the same until another reflection is received.

Any deviation of the aircraft from the path determined by the mask 27 causes the phase detector to produce an output, positive in polarity if the deviation is to one side and negative if the deviation is to the other side. Output of either polarity actuates the warning device 27. The meter 29 shows the direction of deviation and its approximate extent. The deviation signal is also transmitted by way of the modulator 31 and the transmitter 33 to the aircraft, where it operates the deviation indicator 39 and the automatic pilot. Since the receiver 35 on any craft will operate only when the radar beam bears on that craft, a plurality of aircraft may be controlled simultaneously from the same ground station.

Fig. 6 shows a suitable arrangement for modulating the transmitter 33 in accordance with the D.-C. control signal from the phase detector 25. A pulse generator 57 is connected both directly and through a pulse delay circuit 59 to a mixer 61. The radar pulse generator 11 may be used instead of a separate generator 57, if desired. The pulse delay circuit 59 may be of the type known as a phanastron, or any other device for varying the delay of a pulse in response to a D.-C. control voltage. The output of the phase detector 25 controls the device 59.

The output of the mixer 61 comprises two pulses, one directly from the pulse generator 57 and one which has been delayed by the circuit 59. The delay is increased when the phase detector output is one polarity, say positive, and decreased when the phase detector output is of the opposite polarity.

The demodulator 37 at the airborne station is shown in Fig. 7. It comprises a phase detector circuit 63 like the circuit shown in Fig. 5, a pulse delay circuit 65, and a square wave generator 67. The delay of the circuit 65 is fixed at a value equal to the delay provided by the circuit 59 in Fig. 6 when the D.-C. control input is zero. The square wave generator 67 is synchronized by the output of the delay circuit 65 to provide a square (or trapezoidal) wave in response to each pulse in the output of the receiver 35. The duration of each square wave is made considerably less than the pulse repetition period. When the delay between the first and second pulses of a pair is equal to the delay provided by the pulse delay circuit 65, the second pulse will coincide with the leading edge of the square wave produced in response to the first pulse, and the phase detector 63 will give no output. When the received pulses are of greater separation, the second pulse will occur during a positive excursion of the square wave and the phase detector 63 will provide an output of positive polarity. Conversely, a negative output will result when the received pulses are separated by less than the period corresponding to on-course flight of the aircraft.

The deviation indicator 39 operates like the indicator 29 at the ground station to show the direction and extent of lateral departure of the aircraft from the course.

The same principle as is involved in the system of Fig. 1 may also be used for ground approach control or landing of aircraft. Fig. 8 illustrates a system for controlling a craft to fly a predetermined glide path. In this case a sector scanning radar is provided comprising a transmitter 1, receiver 3, T-R box 9, pulse generator 11 and sawtooth wave generator 13 each similar in structure and function to the correspondingly designated elements in Fig. 1. A directive antenna 69 produces a fan shaped beam wide in azimuth but relatively narrow in elevation, and is oscillated in elevation through an angle of perhaps ten degrees by a motor 71. A cathode ray tube 72 like the tube 7 of Fig. 1 is connected to the receiver 3 and has a rotatable deflection yoke 73 energized from the sawtooth generator 13. The motor 71 drives the yoke 73 back and forth in synchronism with the antenna 69, but preferably through a larger angle, such as fifty degrees.

Fig. 9 shows the type of display produced on the tube 72. The deflection center 75 is set off to one side of the screen. The cathode ray beam traces successive radial lines from the point 75, such as the lines 77, 79, 81, 83 and 85. The line 85 is traced when the beam of the antenna 69 is at its lowest elevation, substantially in a horizontal plane. The line 77 corresponds to the maximum elevation of the antenna beam. Although only a few intermediate lines are shown in Fig. 9 it will be understood that the number of such lines may be made as great as is necessary by proper selection of the pulse repetition and scanning periods.

Since the desired glide path is likely to be nearly radial, i. e. almost directly toward the ground station, a course-defining mask would have its edge substantially parallel to one of the scanning lines, for example the line 81. If such a mask were used with the radar scanning pattern as in the system of Fig. 1, few if any of these lines would cross the edge of the opaque portion of the mask and no square wave voltage would be produced. This difficulty is avoided in the system of Fig. 8 by converting the expanded sector radial scan to a television type scan comprising parallel lines.

A television camera 87 is positioned to pick up the image on the tube 72. A cathode ray oscilloscope tube 89 has its deflection yoke 91 connected to the same deflection generator 93 as the camera 87. The tube 89 is biased by a source 95 so as to produce a luminous scanning pattern on the screen. This pattern is represented in Fig. 10 by the vertical lines 97, and is the same as the scanning pattern of the camera 87.

A mask 99 is placed in front of the screen of the tube 89. As shown in Fig. 10, the mask 99 includes an opaque portion 101 whose edge 103 defines the desired glide path as it would appear if shown on the same scale as the expanded sector display on the tube 72. A photocell 23 is positioned in front of the mask 99, and its output is applied to the phase detector 25. The video signal output from the camera 87 is also applied to the phase detector, which is connected to a modulator 31 and transmitter 33 as in the system of Fig. 1.

The video output of the camera 87 includes a series of pulses which appear each time the luminous spot on the tube 72, corresponding to the aircraft to be controlled, is scanned by the camera. The output of the photocell 23 comprises a square wave which goes through its zero crossover each time the spot on the tube 89 passes the edge 103 of the mask 99. The phase detector operates as described in connection with Fig. 1, providing no output when the spot on the tube 72 is at a position corresponding to the edge of the mask 99, and providing output of a polarity corresponding to the direction of deviation (in this case, up or down) when the aircraft is off the desired course.

It will be apparent that the glide path need not be a straight line, but may be curved as desired by properly shaping the edge 103. The deviation signal is converted, transmitted to the aircraft, and utilized in substantially the same manner as in the system of Fig. 1. Although vertical sector scanning is shown in Fig. 8, horizontal sector scanning for radial paths may be obtained with substantially the same system, by oscillating the antenna beam in azimuth instead of elevation.

In addition to its use in course deviation systems, the present invention may be applied to systems for indicating the presence or absence of aircraft within an area or areas defined by a mask. Referring to Fig. 11, the radar apparatus, which may be identical to that shown in detail in Fig. 1, is represented by the block 105. The antenna and drive mechanism are likewise represented by the block 107. The cathode ray tubes 7 and 19 and the photocell 23 are the same as the correspondingly numbered elements of Fig. 1.

A mask 109 is provided between the tube 19 and the photocell 23. The mask 109, as shown in Fig. 12, is opaque except for an area 111 which corresponds to the area to be protected as supervised. The output of the photocell 23 and the pulse output from the radar set 105 are applied to a pulse coincidence responsive circuit 113, which is connected to the warning indicator 27.

Fig. 13 shows a suitable arrangement for the pulse coincidence circuit. A multiple control grid tube 115, such as the type designated in the radio art as a 6L7, has its inner control grid 117 connected to the photocell 23 and its outer control grid 119 connected to the radar set 105. A cathode resistor 121 biases the tube 115 so that no plate current can flow except when positive-going pulses are applied to both grids simultaneously. The plate circuit of the tube 115 is coupled to the warning indicator or alarm circuit.

As in the system of Fig. 1, the beam of the tube 19 scans in synchronism with the tube 7. Whenever the spot crosses the transparent portion 111 of the mask 109, a pulse is produced by the photocell 23. If there is an aircraft anywhere within the area corresponding to the portion 111, the radar set 105 will provide a pulse concurrently with a pulse from the photocell 23. The appearance of these two pulses at once will operate the coincidence circuit 113 and energize the indicator 27.

By using a different mask, the system of Fig. 11 can provide warning whenever an aircraft deviates more than a predetermined amount from a desired course. Referring to Fig. 14, the limits of the desired path are represented by the edges 123 and 125 of an opaque stripe 127. The stripe need not be made of constant width; where the deviation tolerance is greater or smaller, it can be correspondingly wider or narrower. Operation of the system of Fig. 11 with the mask of Fig. 14 is the same as with the mask of Fig. 12.

Maneuvers of aircraft in the vicinity of an airport are generally subject to rules regarding the approach path or flight pattern to be followed in coming in for a landing. The prescribed flight patterns for craft coming from different directions may merge or intersect at one or more points. When two or more aircraft are simultaneously following such patterns, it is necessary to time their respective arrivals differently at these points. The system of Fig. 15 provides a warning or alarm when different craft, following their normal approach patterns, will conflict with each other unless one is redirected.

The radar system in Fig. 15 is the same as that of Fig. 11. An additional cathode ray tube 19', like the tube 19, is arranged to provide a duplicate of the scanning pattern produced by the tube 19. A photocell 23' and a coincidence circuit 113' are associated with the tube 19' in the same way as the photocell 23 and circuit 113 are related to the tube 19. A mask 109' is provided between the tube 19' and the photocell 23'.

The outputs of the coincidence circuits 113 and 113' are applied to trigger circuits 129 and 129' respectively. The latter circuits may be of the Eccles-Jordan type, shown in Fig. 16. A pair of tubes 135 and 137 are connected as direct current amplifiers, with the input of each coupled to the output of the other. The circuit has two stable conditions: one with the tube 135 conducting and the tube 137 cut off, and the other with the tube 135 cut off and the tube 137 conducting. Conduction can be shifted from one tube to the other by application of a pulse of proper polarity to one or the other of the control grids of the tubes 135 and 137. For example when the tube 135 is conductive, a negative pulse applied to its grid will cause it to stop conducting, and make the tube 137 conduct. This condition will persist until disturbed again, as by application of a negative pulse to the tube 137. When the tube 137 is cut off the voltage at its plate is approximately that of the plate supply source. When the tube 137 conducts its plate voltage decreases to a relatively low value. Thus the voltage at the plate of the tube 137 depends on which condition the circuit is in.

The outputs of the coincidence circuits 113 and 115 are connected to the inputs "A" of the trigger circuits 129 and 129'. A periodic switch 133, driven by the antenna drive mechanism, is connected to inputs "B" of the trigger circuits to apply a negative pulse thereto once during each revolution of the antenna. The outputs (from the plates of the tubes 137) of the trigger circuits are applied to a coincidence circuit 131, which is connected to the alarm device 27.

In Fig. 17, two approach paths are represented by dash lines 141 and 143. The paths merge at the point 145. If two aircraft are present simultaneously within the blocks 147 and 149 on the paths 141 and 143 respectively, there is a probability of collision somewhere between the point 145 and the landing strip 151. The masks 109 and 109' are designed like the mask shown in Fig. 12, to correspond to the areas 147 and 149 respectively.

The system of Fig. 15 operates like that of Fig. 11 in that the presence of an aircraft in either of the blocks 147 or 149 will cause output from the corresponding coincidence circuit 113 or 113'. This throws the respective trigger circuit 129 or 129' to apply a positive bias to the coincidence circuit 131. If both trigger circuits are actuated during any one rotation of the antenna, the coincidence circuit 131 will operate and energize the alarm 27. The trigger circuits are required because the pulses from the coincidence circuits 113 and 113' will not occur simultaneously even if there is an airplane in each block. The switch 133 resets both triggers at the end of each complete radar scan, to prevent false operation of the alarm circuit by non-contemporaneous occupation of the blocks 147 and 149. It will be apparent without further illustration that the tubes 19 and 19', with their associated equipment, may be duplicated to any desired extent to protect against other possible conflicts.

I claim as my invention:

1. A system for indicating deviation of a mobile craft from a prescribed course or position, including search radar apparatus which embodies a cathode ray oscilloscope and means providing voltages for deflecting and controlling the intensity of the cathode ray beam of said oscilloscope to provide a map-like visual display wherein the position of said craft is represented by a luminous spot, a second cathode ray oscilloscope similar to that in said radar system and means for deflecting the beam of said second oscilloscope in synchronism with the deflection of the beam of said first oscilloscope, means maintaining the intensity of said beam of said second oscilloscope substantially constant whereby said second oscilloscope provides a luminous display corresponding to the scanning pattern of said first oscilloscope, a mask covering the display on said second oscilloscope and including opaque and transparent portions which define said prescribed course or position, a photoelectric cell adjacent said mask and positioned to receive light passing through said mask from said second oscilloscope, and means for comparing the timing of the output of said photoelectric cell with that of the beam intensity control voltage which is applied to said first oscilloscope to indicate any deviation of the craft from said course.

2. A system for indicating entry of a mobile craft into a predetermined zone, including search radar apparatus which embodies a cathode ray oscilloscope and means providing voltages for deflecting and controlling the intensity of the cathode ray beam of said oscilloscope to provide a map-like visual display wherein the position of said craft is represented by a luminous spot, a second cathode ray oscilloscope similar to that in said radar system and means for deflecting the beam of said second oscilloscope in synchronism with the deflection of the beam of said first oscilloscope, means maintaining the intensity of said beam of said second oscilloscope substantially constant whereby said second oscilloscope provides a luminous display corresponding to the scanning pattern of said first oscilloscope, a mask covering the display on said second oscilloscope and including opaque and transparent portions which define said prescribed zone, a photoelectric cell adjacent said mask and positioned to receive light passing through said mask from said second oscilloscope, and means for comparing the output of said photoelectric cell with the beam intensity control voltage which is applied to said first oscilloscope to indicate the presence of the craft in said zone.

3. A system for indicating deviation of an object from a preassigned position, including means providing a cyclical time reference signal and a second cyclical signal whose timing with respect to said reference signal depends on the actual position of said object, an element formed with a reference pattern defining said preassigned position, means scanning said reference pattern in synchronism with said time reference signal to produce a further cyclical signal similar to said second signal but timed with respect to said time reference signal in accordance with said preassigned position, and means indicating the instantaneous time deviation between said last mentioned signal and said second signal.

4. A system for indicating deviation of an object from a preassigned position, including means providing a cyclical time reference signal and a second cyclical signal whose timing with respect to said reference signal depends on the actual position of said object, a mask comprising transparent and opaque portions defining said preassigned position, a light source and a photoelectric device separated by said mask, means scanning said mask with said light source in synchronism with said time reference signal to produce from said photoelectric device a further cyclical signal similar to said second signal but timed with respect to said time reference signal in accordance with said preassigned position, and means indicating the instantaneous time deviation between said last mentioned signal and said second signal.

5. A system for indicating deviation of a mobile craft from a prescribed course or position within a service area, including search radar transmitter and receiver apparatus which from a fixed point angularly scans said area with directive radiations and scans it in range in different directions by periodically pulsing said radiations to provide periodic pulse output signals from said receiver whose timing with relation to said scanning and pulsing corresponds to the position of said craft within said area, means for periodically producing a signal having an amplitude which varies rapidly between predetermined limits, the time at which said signal varies between said limits being determined by the configuration of said prescribed course and by the instantaneous directivity of said directive radiations, means responsive to the relative times of occurrence of one of said receiver signals and the instant of variation of said rapidly varying signal for producing a further signal which corresponds to said deviation, and means for reproducing said further signal on board said craft.

PHILIP J. HERBST.

References Cited in the file of this patent

UNITED STATES PATENTS

| Number | Name | Date |
|---|---|---|
| 2,027,527 | Hammond | Jan. 14, 1936 |
| 2,307,029 | Elm | Jan. 5, 1943 |
| 2,403,729 | Loughren | July 9, 1946 |
| 2,406,751 | Emerson | Sept. 3, 1946 |
| 2,418,143 | Stodola | Apr. 1, 1947 |
| 2,421,017 | Deloraine | May 27, 1947 |
| 2,434,897 | Ayres | Jan. 27, 1948 |
| 2,464,258 | Prichard | Mar. 15, 1949 |
| 2,513,282 | Busignies | July 4, 1950 |
| 2,514,351 | Smith | July 4, 1950 |
| 2,535,038 | Busignies | Dec. 26, 1950 |